United States Patent
Seol

(10) Patent No.: US 8,952,561 B2
(45) Date of Patent: Feb. 10, 2015

(54) BATTERY PACK FOR ELECTRIC BICYCLE AND CONTROL METHOD THEREOF

(75) Inventor: Jihwan Seol, Yongin-si (KR)

(73) Assignee: Samsung SDI Co., Ltd., Giheung-gu, Yongin-si, Gyeonggi-do (KR)

(*) Notice: Subject to any disclaimer, the term of this patent is extended or adjusted under 35 U.S.C. 154(b) by 789 days.

(21) Appl. No.: 13/209,331

(22) Filed: Aug. 12, 2011

(65) Prior Publication Data

US 2012/0146429 A1 Jun. 14, 2012

(30) Foreign Application Priority Data

Dec. 8, 2010 (KR) ................. 10-2010-0125167

(51) Int. Cl.
| | | |
|---|---|---|
| *B60R 25/00* | (2013.01) | |
| *B62M 6/45* | (2010.01) | |
| *B60R 25/32* | (2013.01) | |
| *B62M 6/90* | (2010.01) | |

(52) U.S. Cl.
CPC .................. *B62M 6/45* (2013.01); *B60R 25/32* (2013.01); *B62M 6/90* (2013.01)
USPC ......................................................... 307/9.1

(58) Field of Classification Search
CPC ........ B60R 25/04; B60R 25/32; B60R 25/403
USPC ......................................................... 307/9.1
See application file for complete search history.

(56) References Cited

U.S. PATENT DOCUMENTS

| | | | | |
|---|---|---|---|---|
| 6,057,657 A | * | 5/2000 | Kitamura ......................... | 318/16 |
| 7,081,028 B1 | * | 7/2006 | Crane .............................. | 440/84 |
| 7,369,035 B2 | * | 5/2008 | Konno et al. ................. | 340/5.73 |
| 8,587,405 B2 | * | 11/2013 | Denison et al. .............. | 340/5.73 |
| 2002/0088653 A1 | | 7/2002 | Takamoto et al. | |
| 2002/0180274 A1 | * | 12/2002 | Suman ........................ | 307/10.2 |
| 2003/0080859 A1 | * | 5/2003 | Tsuji .............................. | 340/426 |
| 2003/0107479 A1 | * | 6/2003 | Evans ........................... | 340/427 |
| 2006/0091729 A1 | * | 5/2006 | Kamiya et al. ................ | 307/10.1 |
| 2006/0145836 A1 | * | 7/2006 | Miyazaki ................... | 340/539.1 |
| 2006/0244575 A1 | * | 11/2006 | Ramirez et al. .......... | 340/426.35 |
| 2007/0074918 A1 | | 4/2007 | Meyer | |
| 2007/0188310 A1 | * | 8/2007 | Mori et al. ............... | 340/426.36 |
| 2007/0192599 A1 | * | 8/2007 | Kato et al. .................... | 713/168 |

(Continued)

FOREIGN PATENT DOCUMENTS

| | | |
|---|---|---|
| JP | 08-260784 | 10/1996 |
| JP | 2000-080843 | 3/2000 |

(Continued)

OTHER PUBLICATIONS

Korean Notice of Allowance issued on Aug. 28, 2012 corresponding to Korean Application No. 10-2010-0125167 and Request for Entry attached herewith.

*Primary Examiner* — Adi Amrany

(74) *Attorney, Agent, or Firm* — Robert E. Bushnell, Esq.

(57) ABSTRACT

Provided is a battery pack for electric bicycle and a control method of the battery pack, and the battery pack may prevent the electric bicycle from moving abnormally. The electric bicycle includes a motor and a motion sensor. The battery pack includes a battery, a main switch and a controller. The main switch controls supply of a power which is supplied from the battery to the electric bicycle. The controller outputs a motor hold signal to put the motor in a hold state, when an abnormal motion sensing signal is received from the motion sensor.

18 Claims, 4 Drawing Sheets

(56) References Cited

U.S. PATENT DOCUMENTS

2010/0171603 A1* 7/2010 Dhawan et al. .......... 340/426.13
2010/0228405 A1* 9/2010 Morgal et al. ................ 701/2
2011/0095623 A1* 4/2011 Doh et al. .................... 307/119
2011/0279226 A1* 11/2011 Chen et al. ................... 340/5.8
2013/0151293 A1* 6/2013 Karner et al. .................... 705/5

FOREIGN PATENT DOCUMENTS

| JP | 2007-15567 A | 1/2007 |
| JP | 2008-260400 | 10/2008 |
| KR | 10-2002-0043328 | 6/2002 |
| KR | 10-0933690 B1 | 12/2009 |

* cited by examiner

BATTERY PACK FOR ELECTRIC BICYCLE AND CONTROL METHOD THEREOF

CLAIM OF PRIORITY

This application makes reference to, incorporates the same herein, and claims all benefits accruing under 35 U.S.C. §119 from an application earlier filed in the Korean Intellectual Property Office on 8 Dec. 2010 and there duly assigned Serial No. 10-2010-0125167.

BACKGROUND OF THE INVENTION

1. Field of the Invention

Embodiments of the present invention relate to a battery pack for electric bicycle and a control method for controlling the battery pack.

2. Description of the Related Art

Unlike primary batteries which are only incapable of charge, secondary batteries are chargeable/dischargeable batteries. The secondary batteries are implemented in a battery pack type that includes a battery cell and a charge/discharge circuit. Such a battery pack may be applied to portable small electronic devices such as portable phones and camcorders, and the battery pack may be widely used as the motor driving power sources of hybrid vehicles.

Recently, general mechanical bicycles that are being used as a commute means and a hobby means disadvantageously require a lot of stamina of riders while climbing uphill roads and while maintaining certain riding speeds. Due to this reason, electric bicycles are in high demand, because electric bicycles may save riders a lot of energy.

Such electric bicycles are generally driven by a motor, and therefore battery packs may be used as the motor driving power sources for the electric bicycles.

SUMMARY OF THE INVENTION

An aspect of the present invention provides a battery pack for electric bicycle and a control method for controlling the battery pack, and the battery pack may prevent the electric bicycle from moving abnormally.

According to at least one of embodiments, a battery pack for an electric bicycle including a motor and a motion sensor, includes a battery; a main switch controlling supply of a power which is supplied from the battery to the electric bicycle; and a controller outputting a motor hold signal to put the motor in a hold state in which the electric bicycle is prevented from moving, when an abnormal motion sensing signal is received from the motion sensor.

The electric bicycle may further include an alarm unit electrically connected to the controller, and the controller of the battery pack may output an alarm driving signal to allow the alarm, unit to operate when the abnormal motion sensing signal is received from the motion sensor.

The battery pack may further include: a wireless receiver receiving a unique identification (ID) signal from a portable electronic device or from a charger through wireless communication to transmit the unique ID signal to the controller.

The wireless receiver may include any one of a bluetooth communication module, an infrared communication module, a radio frequency (RF) frequency communication module and a zigbee communication module, for receiving the unique ID signal.

The controller may store a predetermined ID signal, and compare the predetermined ID signal and the unique ID signal.

The electric bicycle may further include a motor driving circuit disposed between the controller of the battery pack and the motor to control driving of the motor.

When the predetermined ID signal is the same as the unique ID signal, the controller may transmit a motor on signal to the motor driving circuit to allow the motor to be driven.

When the predetermined ID signal differs from the unique ID signal, the controller may transmit a motor off signal to the motor driving circuit to disallow the motor to be driven.

The battery pack may further include a charge circuit electrically connected to the battery to control charge of the battery.

When the predetermined ID signal is the same as the unique ID signal, the controller may transmit a charge on signal to the charge circuit to allow the battery to be charged by the charger.

When the predetermined ID signal differs from the unique ID signal, the controller may transmit a charge off signal to the charge circuit to disallow the battery to be charged by the charger.

According to another embodiment, a battery pack for an electric bicycle including a motor and a motion sensor, includes a battery; a main switch controlling supply of a power which is supplied from the battery to the electric bicycle; and a controller outputting a motor reverse rotation signal to put the motor in a reverse rotation state in which the electric bicycle moves in a second direction opposite to a first direction along which the electric bicycle is forcibly moved, when an abnormal motion sensing signal is received from the motion sensor.

According to still another embodiment, a method of controlling a battery pack for an electric bicycle including a motor and a motion sensor, includes steps of: determining whether an abnormal motion sensing signal is received from the motion sensor; and outputting a motor hold signal or a motor reverse rotation signal to put the motor in a hold state or a reverse rotation state, when the abnormal motion sensing signal is received.

The electric bicycle may further include an alarm unit, and the method may further include outputting an alarm driving signal for the alarm unit to operate, when the abnormal motion sensing signal is received.

The battery pack may further include a wireless receiver, and the method may further include receiving a unique identification (ID) signal from a portable electronic device or a charger through the wireless receiver.

The method may further include a step of comparing the unique ID signal and a predetermined ID signal.

The electric bicycle may further include a motor driving circuit electrically connected to the motor, and the method may further include transmitting a motor on signal to the motor driving circuit for the motor to operate, when the unique ID signal is the same as the predetermined ID signal.

The electric bicycle may further include a motor driving circuit electrically connected to the motor, and the method may further include transmitting a motor off signal to the motor driving circuit for the motor not to operate, when the unique ID signal differs from the predetermined ID signal.

The battery pack may further include a charge circuit electrically connected to the battery, and the method may further include transmitting a charge on signal to the charge circuit for the battery to be charged, when the unique ID signal is the same as the predetermined ID signal.

The battery pack may further include a charge circuit connected to the battery, and the method may further include transmitting a charge off signal to the charge circuit for the battery not to be charged, when the unique ID signal differs from the predetermined ID signal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). Furthermore, when it is described that one comprises (or includes or has) some elements, it should be understood that it may comprise (or include or has) only those elements, or it may comprise (or include or have) other elements as well as those elements if there is no specific limitation.

Hereinafter, embodiments will be described in detail with reference to the accompanying drawings.

Figure 1:
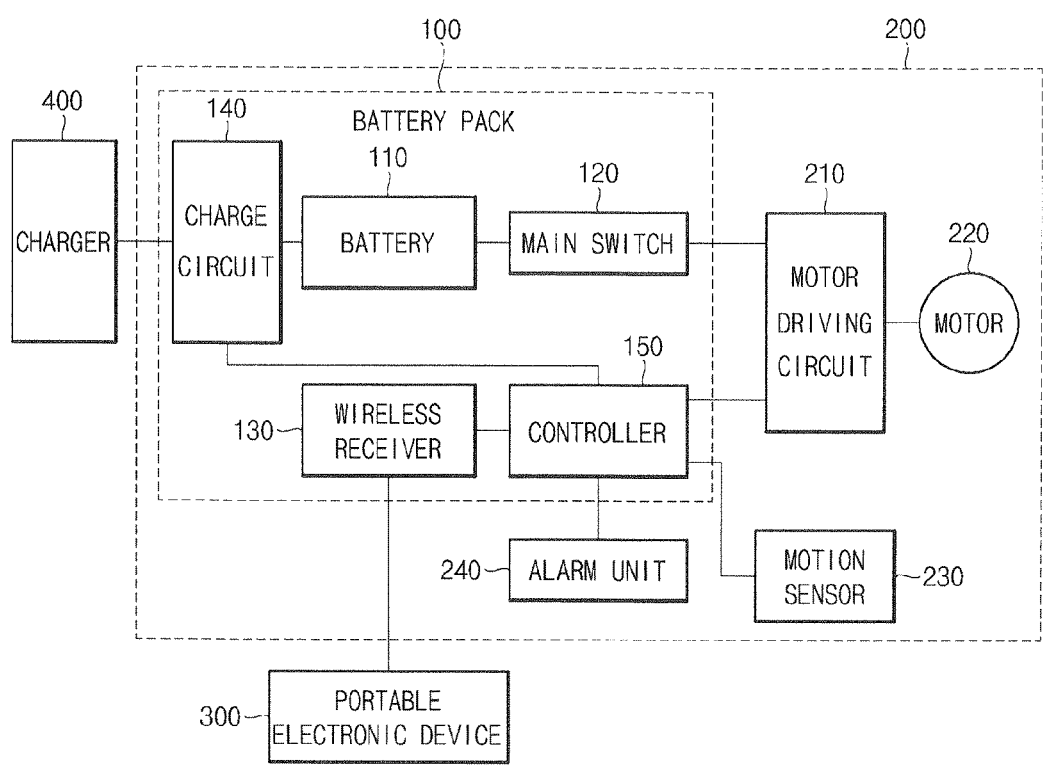
FIG. 1 is a block diagram schematically illustrating a battery pack for electric bicycle constructed with an embodiment and a partial component of the electric bicycle.
Figure 2:
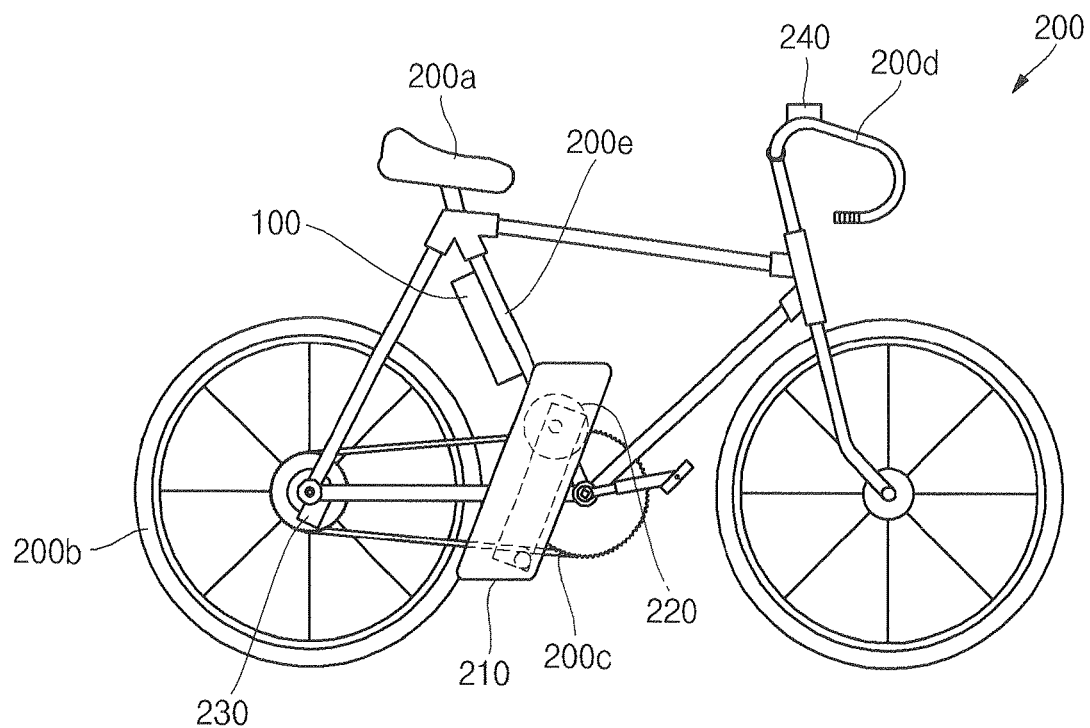
FIG. 2 is a diagram illustrating an electric bicycle applying the battery pack of FIG. 1.

FIG. 1 is a block diagram schematically illustrating a battery pack for electric bicycle constructed with an embodiment and a partial component of the electric bicycle. FIG. 2 is a diagram illustrating an electric bicycle applying the battery pack of FIG. 1.

Referring to FIG. 1, an electric bicycle 200 includes a battery pack 100, a motor driving circuit 210, a motor 220, and a motion sensor 230. Referring to FIG. 2, the electric bicycle 200 fundamentally includes a saddle 200a, a wheel 200b, a chain 200c, a handle 200d, and a frame 200e. Herein, the frame 200e connects the saddle 200a, the wheel 200b, the chain 200c and the handle 200d.

The battery pack 100 of the electric bicycle 200 may wirelessly communicate with the portable electronic device 300 and allow driving of the motor 220 of the electric bicycle 200 to be controlled. Also, the battery pack 100 may wirelessly communicate with the charger 400 and allow charge of a battery 110 to be controlled. Herein, the portable electronic device 300 may be a device, which may perform wireless communication, such as a portable phone. Moreover, the charger 400 may be a device that may charge the battery 110 of the battery pack 100 and perform wireless communication.

Next, the battery pack 100 applied to the electric bicycle 200 will be described below in detail.

The battery pack 100 includes a battery 110, a main switch 120, a wireless receiver 130, a charge circuit 140, and a controller 150.

As a chargeable/dischargeable battery, the battery 110 may include at least one battery cell. The battery cell may be a lithium ion battery cell, but it is not limited thereto.

The main switch 120 is electrically connected to the battery 110, and controls supply of a power that is supplied from the battery 110 to the electric bicycle 200. The main switch 120 may be controlled by a user. For example, when the user turns on the main switch 120, the power of the battery 110 is supplied to the controller 150 and thus driving of the controller 150 is started, and moreover, the power of the battery 110 is supplied to the electric bicycle 200 and thereby the power source of the electric bicycle 200 is turned on.

The wireless receiver 130 receives unique identification (ID) signal from the portable electronic device 300 or the charger 400, and the wireless receiver 130 transmits the unique ID signal to the controller 150.

The unique ID signal received from the portable electronic device 300 is a specific signal that is provided by a user using the portable electronic device 300, and is used as an authentication signal for recognizing that the user is the authorized user of the electric bicycle 200.

Also, the unique ID signal received from the charger 400 is a specific signal that is stored in the charger 400, and is used as an authentication signal for recognizing that the charger 400 is the dedicated charger of the battery pack 100.

The unique ID signal received from the portable electronic device 300 may be the same as or different from the unique ID signal received from the charger 400. The unique ID signal may be received through any one wireless communication that is selected from among Bluetooth communication, infrared communication, radio frequency (RF) communication and ZigBee communication. For this, the wireless receiver 130 may be implemented with any one of a bluetooth communication module, an infrared communication module, an RF frequency communication module and a zigbee communication module.

The charge circuit 140 may be electrically connected to the battery 110, and controls charge of the battery 110 that is performed by the charger 400. For this, the charge circuit 140 may include a charge control device.

When the battery pack 100 is applied to the electric bicycle 200, the controller 150 compares a predetermined ID signal that is internally stored and a predetermined unique ID signal which is received from the portable electronic device 300 through the wireless receiver 130, and outputs a motor on signal or a motor off signal according to the compared result.

That is, when the unique ID signal is the same as the predetermined ID signal, the controller 150 outputs and transmits the motor on signal to the motor driving circuit 210, and thus allows the motor driving circuit 210 to drive the motor 220. When the unique ID signal differs from the predetermined ID signal, the controller 150 outputs and transmits the motor off signal to the motor driving circuit 210, and thus disallows the motor driving circuit 210 to drive the motor 220. Herein, the unique ID signal being the same as the predetermined ID signal denotes that the user of the electric bicycle 200 is an authorized user. Furthermore, the unique ID signal differing from the predetermined ID signal denotes that the user of the electric bicycle 200 is an unauthorized user, for example, a thief.

Moreover, when the battery pack 100 is electrically connected to the charger 400, the controller 150 compares the predetermined ID signal that is internally stored and a unique ID signal which is received from the charger 400 through the wireless receiver 130, and outputs a charge on signal or a charge off signal according to the compared result.

That is, when the unique ID signal received from the charger 400 is the same as the predetermined ID signal, the controller 150 outputs and transmits the charge on signal to the charge circuit 140, and thus allows the battery 110 to be charged by the charger 400. When the unique ID signal differs from the predetermined ID signal, the controller 150 outputs and transmits the charge off signal to the charge circuit 140, and thus disallows the battery 110 to be charged by the charger 400. Herein, the unique ID signal being the same as the predetermined ID signal denotes that the charger 400 is the dedicated charger of the battery pack 100. Furthermore, the unique ID signal differing from the predetermined ID signal denotes that the charger 400 is not the dedicated charger of the battery pack 100, i.e., the battery pack 100 is a stolen battery pack. Therefore, even when an unauthorized user steals the electric bicycle 200, the unauthorized user is not able to use the electric bicycle by failing to charge the battery pack 100.

The motor driving circuit 210 of the electric bicycle 200 is electrically connected between the controller 150 and the motor 220, and when a motor on signal is received from the controller 150 of the battery pack 100, the motor driving circuit 210 drives the motor 220. Also, when a motor off signal is received from the controller 150, the motor driving circuit 210 does not drive the motor 220.

The motor 220 is connected to the motor driving circuit 210, and the motor 220 is driven or is not driven according to control of the motor driving circuit 210. The motor 220 may be a power generator that substantially moves the electric bicycle 200.

The motion sensor 230 is disposed in the wheel 200b of the electric bicycle 200 and may be connected to the controller 150. The motion sensor 230 senses the motion of the electric bicycle 200 through rotation of the wheel 200b. The motion sensor 230 may be implemented as a photo sensor etc. Also, when any abnormal motion of the electric bicycle 200 is sensed by the motion sensor 230, the motion sensor 230 transmits an abnormal motion sensing signal to the controller 150. Therefore, the controller 150 outputs and transmits a motor hold signal or a motor reverse rotation signal to the motor driving circuit 210, and thus it puts the motor 220 in a hold state or in a reverse rotation state. Herein, the abnormal motion sensing signal is generated by the motion sensor 230 when an unauthorized user forcibly takes the electric bicycle 200, i.e., the wheel 200b is moved undesirably.

The hold state of the motor 220 denotes a state that stops the electric bicycle 200 from moving. The reverse rotation state of the motor 220 is a state that allows the electric bicycle 200 to move in a direction opposite to a direction where the electric bicycle 200 is forcibly moved, for example, the forward direction of the electric bicycle 200. Herein, the reverse rotation state of the motor 220 can more reduce current consumption than the hold state of the motor 220.

An alarm unit 240 is connected to the controller 150, and when the controller 150 receives an abnormal motion sensing signal from the motion sensor 230, the alarm unit 240 receives an alarm driving signal from the controller 150 and is thereby driven. Alarm sound or an alarm voice message may be generated by driving of the alarm unit 240.

As described above, when the controller 150 receives the abnormal motion sensing signal from the motion sensor 230 of the electric bicycle 200, the battery pack 100 for electric bicycle constructed with an embodiment puts the motor 220 in the hold state or the reverse rotation state, and thus may prevent an unauthorized user from forcibly taking the electric bicycle 200.

Moreover, in the battery pack 100 for electric bicycle constructed with an embodiment, the controller 150 compares the predetermined ID signal and the unique ID signal of the portable electronic device 300, and when the predetermined ID signal differs from the unique ID signal, the controller 150 disallows the motor 200 to be driven, thereby preventing the theft of the electric bicycle 200.

Moreover, in the battery pack 100 for electric bicycle according to an embodiment, the controller 150 compares the predetermined ID signal and the unique ID signal of the charger 400, and when the predetermined ID signal differs from the unique ID signal, the controller 150 disallows the battery 110 to be charged, thereby preventing a stolen electric bicycle 200 from being used anywhere.

Next, a method of controlling the battery pack 100 for electric bicycle according to an embodiment will be described below in detail with reference to FIGS. 1 and 2. First, a method of controlling driving between the battery pack 100 and the motor 220 will be described below.

Figure 3:
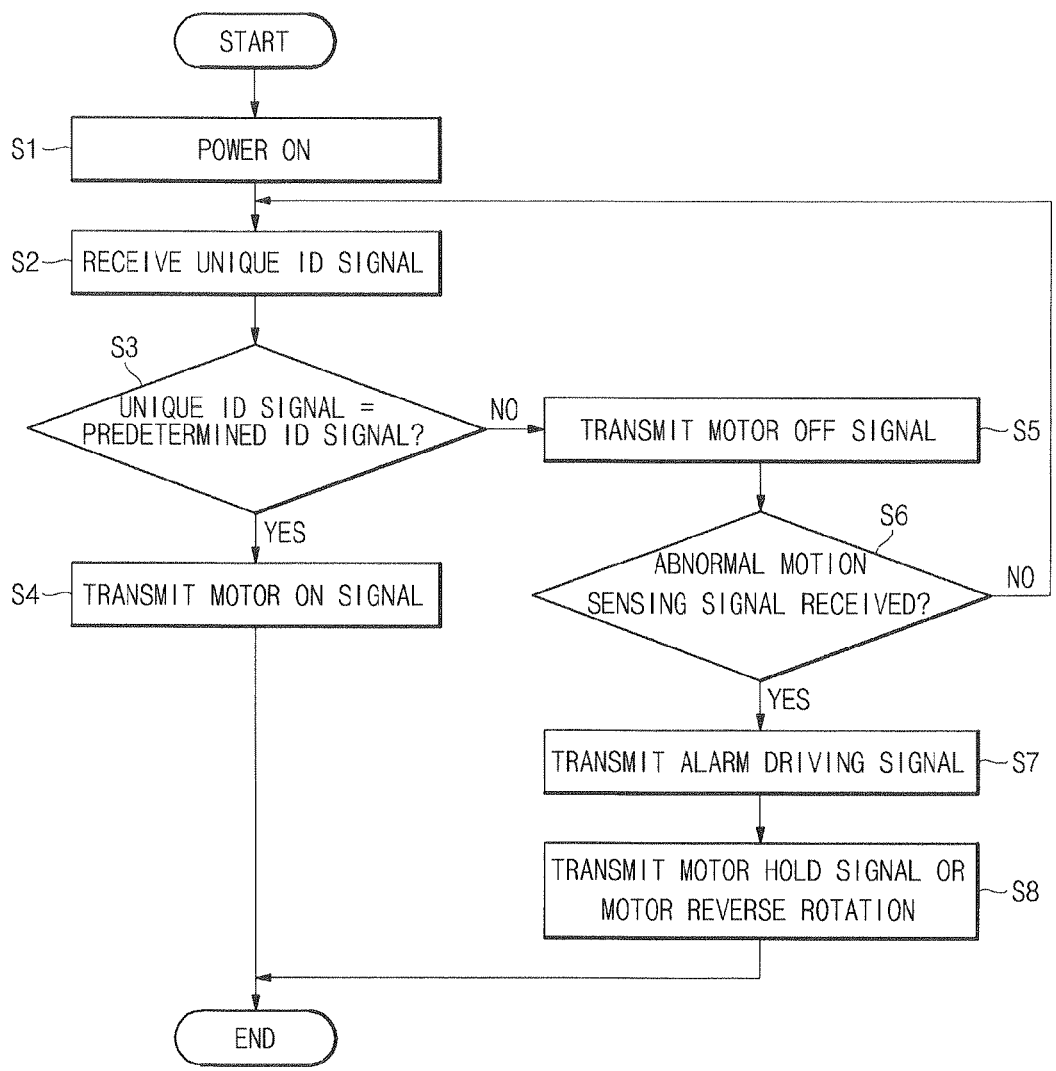
FIG. 3 is a flowchart illustrating a method of controlling driving between a battery pack and a motor in a method of controlling a battery pack for electric bicycle constructed with an embodiment.

FIG. 3 is a flowchart illustrating a method of controlling driving between a battery pack and a motor in a method of controlling a battery pack for electric bicycle according to an embodiment.

Referring to FIG. 3, a method of controlling driving between the battery pack 100 and the motor 220 in a method of controlling the battery pack for electric bicycle according to an embodiment may include a power-on operation S1, a unique ID signal receiving operation S2, a unique ID signal comparing operation S3, a motor on signal transmitting operation S4, a motor off signal transmitting operation S5, an abnormal motion sensing signal reception determining operation S6, an alarm driving signal transmitting operation S7, a motor hold signal/motor reverse rotation signal transmitting operation S8.

The power-on operation S1 is an operation that turns on the power source of the battery pack 100. The power-on operation S1 of the battery pack 100 may be performed by user's turning on the main switch 120. In this case, the power of the battery 110 is supplied to the controller 150 and the electric bicycle 200, and thus driving of the controller 150 is started and the power source of the electric bicycle 200 is turned on.

The unique ID signal receiving operation S2 is an operation in which the controller 150 receives the unique ID signal from the portable electronic device 300 through the wireless receiver 130. Herein, the unique ID signal may be received through any one communication that is selected from among Bluetooth communication, infrared communication, RF communication and ZigBee communication.

The unique ID signal comparing operation S3 is an operation in which the controller 150 compares the unique ID signal from the portable electronic device 300 and the predetermined ID signal. That is, the controller 150 compares whether the unique ID signal is the same as or differs from the predetermined ID signal.

The motor on signal transmitting operation S4 is an operation in which the controller 150 transmits the motor on signal to the motor driving circuit 210 when the unique ID signal is the same as the predetermined ID signal. The motor driving circuit 210 drives the motor 220 according to the received motor on signal. Therefore, the electric bicycle 200 moves normally.

The motor off signal transmitting operation S5 is an operation in which the controller 150 transmits the motor off signal to the motor driving circuit 210 when the unique ID signal differs from the predetermined ID signal. The motor driving circuit 210 does not drive the motor 220 according to the received motor off signal. Therefore, the electric bicycle 200 does not move. Accordingly, when a current user is not the authorized user of the electric bicycle 200, the electric bicycle 200 does not move.

The abnormal motion sensing signal reception determining operation S6 is an operation in which the controller 150 determines whether the abnormal motion sensing signal is received from the motion sensor 230.

The alarm driving signal transmitting operation S7 is an operation in which the controller 150 outputs and transmits the alarm driving signal to the alarm unit 240 when the abnormal motion sensing signal is received. In this case, the alarm unit 240 outputs alarm sound or an alarm voice message. Therefore, the alarm unit 240 may give the alarm to the unauthorized user of the electric bicycle 200.

The motor hold signal/motor reverse rotation signal transmitting operation S8 is an operation in which the controller 150 outputs and transmits a motor hold signal or a motor rotation signal to the motor driving circuit 210 when the abnormal motion sensing signal is received. The motor driving circuit 210 puts the motor 220 in the hold state or the reverse rotation state according to the motor hold signal or the motor rotation signal. Therefore, when the electric bicycle 200 is forcibly moved by an unauthorized user, the electric bicycle 200 is stopped or moves in a direction opposite to a direction where the electric bicycle 200 is forcibly moved, for example, the forward direction thereof. Furthermore, the motor hold signal/motor reverse rotation signal transmitting operation S8 may be performed prior to or simultaneously with the alarm driving signal transmitting operation S7.

Next, a method of controlling driving between the battery pack 100 and the charger 400 will be described below.

Figure 4:
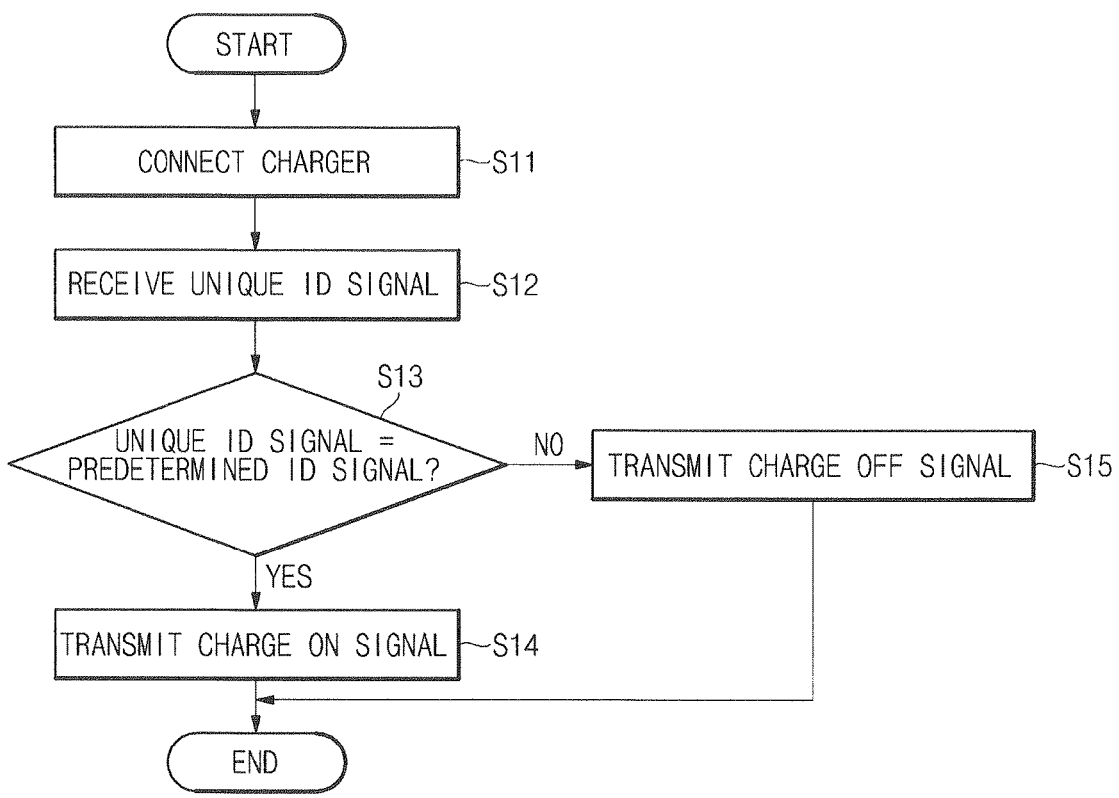
FIG. 4 is a flowchart illustrating a method of controlling driving between a battery pack and a charger in a method of controlling a battery pack for electric bicycle constructed with an embodiment.

FIG. 4 is a flowchart illustrating a method of controlling driving between a battery pack and a charger in a method of controlling a battery pack for electric bicycle constructed with an embodiment.

Referring to FIG. 4, a method of controlling driving between the battery pack 100 and the motor 220 in a method of controlling the battery pack for electric bicycle according to an embodiment may include a charger connecting operation S11, a unique ID signal receiving operation S12, a unique ID signal comparing operation S13, a charge on signal transmitting operation S14, and a charge off signal transmitting operation S15.

The charger connecting operation S11 is an operation that connects the battery pack 100 to the charger 400. The charger connecting operation S11 may be performed by a user who connects the battery pack 100 to the charger 400.

The unique ID signal receiving operation S12 is an operation in which the controller 150 receives the unique ID signal from the charger 400 through the wireless receiver 130. Herein, the unique ID signal may be received through any one communication that is selected from among Bluetooth communication, infrared communication, RF communication and ZigBee communication.

The unique ID signal comparing operation S13 is an operation in which the controller 150 compares the unique ID signal and the predetermined ID signal. That is, the controller 150 compares whether the unique ID signal is the same as or differs from the predetermined ID signal.

The charge on signal transmitting operation S14 is an operation in which the controller 150 transmits the charge on signal to the charge circuit 140 when the unique ID signal is the same as the predetermined ID signal. The charge circuit 140 allows the charger 400 to charge the battery 110 according to the received charge on signal.

The charge off signal transmitting operation S15 is an operation in which the controller 150 transmits the charge off signal to the charge circuit 140 when the unique ID signal differs from the predetermined ID signal. The charge circuit 140 disallows the charger 110 to charge the battery 110 according to the received charge off signal.

In an embodiment of the present invention, the battery pack for electric bicycle and the control method thereof according to embodiments put the motor in the hold state or the reverse rotation state when the controller receives an abnormal motion sensing signal from the motion sensor of the electric bicycle, and thus can prevent an unauthorized user from forcibly taking the electric bicycle.

In an embodiment of the present invention, the battery pack for electric bicycle and the control method thereof according to embodiments compares the predetermined ID signal and the unique ID signal of the portable electric device through the controller, and when the predetermined ID signal differs from the unique ID signal, the battery pack and the control method stop the motor from being driven, thereby preventing the theft of the electric bicycle.

In an embodiment of the present invention, the battery pack for electric bicycle and the control method thereof according to embodiments compares the predetermined ID signal and the unique ID signal of the charger through the controller, and when the predetermined ID signal differs from the unique ID signal, the battery pack and the control method stop the battery from being charged, and thus can prevent a stolen electric bicycle from being used anywhere.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A battery pack for an electric bicycle including a motor and a motion sensor, the battery pack comprising:
a battery;
a main switch controlling supply of a power which is supplied from the battery to the electric bicycle; and
a controller, when the electric bicycle abnormally moves in a first direction along which the electric bicycle is forcibly moved and an abnormal motion sensing signal is received from the motion sensor due to the abnormal movement of the electric bicycle, outputting a motor reverse rotation signal to put the motor in a reverse rotation state in which the electric bicycle moves in a second direction opposite to the first direction.

2. The battery pack as claimed in claim 1, wherein:
when the abnormal motion sensing signal is received from the motion sensor, the controller outputs an alarm driving signal to drive an alarm unit of the electric bicycle to operate, with the alarm unit being electrically connected to the controller.

3. The battery pack as claimed in claim 1, further comprising:
a wireless receiver receiving a unique identification (ID) signal from a portable electronic device or from a charger through wireless communication and transmitting the unique ID signal received to the controller.

4. The battery pack as claimed in claim 3, wherein the wireless receiver comprises any one of a bluetooth communication module, an infrared communication module, a radio frequency (RF) frequency communication module and a zigbee communication module, for receiving the unique ID signal.

5. The battery pack as claimed in claim 3, wherein the controller stores a predetermined ID signal, and compares the predetermined ID signal and the unique ID signal.

6. The battery pack as claimed in claim 5, wherein, when the predetermined ID signal is the same as the unique ID signal, the controller transmits a motor on signal to a motor driving circuit of the electric bicycle to allow the motor of the electric bicycle to be driven, with the motor driving circuit being disposed between the controller of the battery pack and the motor of the electric bicycle.

7. The battery pack as claimed in claim 5, wherein, when the predetermined ID signal differs from the unique ID signal, the controller transmits a motor off signal to a motor driving circuit of the electric bicycle to disallow the motor of the electric bicycle to be driven.

8. The battery pack as claimed in claim 5, further comprising:
    a charge circuit electrically connected to the battery in order to control charge of the battery.

9. The battery pack as claimed in claim 8, wherein, when the predetermined ID signal is the same as the unique ID signal, the controller transmits a charge on signal to the charge circuit to allow the battery to be charged by the charger.

10. The battery pack as claimed in claim 8, wherein, when the predetermined ID signal differs from the unique ID signal, the controller transmits a charge off signal to the charge circuit to disallow the battery to be charged by the charger.

11. A method of controlling a battery pack for an electric bicycle including a motor and a motion sensor, the method comprising:
    determining whether an abnormal motion sensing signal is received from the motion sensor; and
    when the electric bicycle abnormally moves in a first direction along which the electric bicycle is forcibly moved and the abnormal motion sensing signal is received by the battery pack due to the abnormal movement of the electric bicycle, outputting a motor reverse rotation signal to put the motor in a reverse rotation state in which the electric bicycle moves in a second direction opposite to the first direction.

12. The method as claimed in claim 11, further comprising a step of, when the abnormal motion sensing signal is received by the battery pack, outputting an alarm driving signal and informing an alarm unit of the electric bicycle to operate.

13. The method as claimed in claim 11, further comprising a step of receiving a unique identification (ID) signal from a portable electronic device or from a charger through a wireless receiver of the battery pack.

14. The method as claimed in claim 13, further comprising a step of comparing the unique ID signal and a predetermined ID signal.

15. The method as claimed in claim 14, further comprising a step of, when the unique ID signal is the same as the predetermined ID signal, transmitting a motor on signal to a motor driving circuit of the electric bicycle and informing the motor of the electric bicycle to operate, with the motor driving circuit being electrically connected to the motor.

16. The method as claimed in claim 14, further comprising a step of, when the unique ID signal differs from the predetermined ID signal, transmitting a motor off signal to a motor driving circuit of the electric bicycle and informing the motor not to operate, with the motor driving circuit being electrically connected to the motor.

17. The method as claimed in claim 14, further comprising a step of, when the unique ID signal is the same as the predetermined ID signal, transmitting a charge on signal to a charge circuit of battery pack and allowing the battery to be charged, with the charge circuit being electrically connected to the battery.

18. The method as claimed in claim 14, further comprising a step of, when the unique ID signal differs from the predetermined ID signal, transmitting a charge off signal to a charge circuit of the battery pack and disallowing the battery to be charged, with the charge circuit being electrically connected to the battery.

* * * * *